(12) United States Patent
Muramatsu et al.

(10) Patent No.: US 12,296,746 B2
(45) Date of Patent: May 13, 2025

(54) STEERING WHEEL HAVING ILLUMINATION UNIT (71) Applicant: TOYODA GOSEI CO., LTD., Kiyosu (JP)

(72) Inventors: Kazuma Muramatsu, Kiyosu (JP); Akitoshi Naganawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/797,879

(22) Filed: Aug. 8, 2024

(65) Prior Publication Data

US 2025/0074300 A1  Mar. 6, 2025

(30) Foreign Application Priority Data

Sep. 6, 2023 (JP) .................. 2023-144074

(51) Int. Cl.
| | | |
|---|---|---|
| B60Q 3/283 | (2017.01) | |
| F21V 19/00 | (2006.01) | |
| F21W 106/00 | (2018.01) | |
| F21Y 105/18 | (2016.01) | |
| F21Y 113/00 | (2016.01) | |
| F21Y 115/10 | (2016.01) | |

(52) U.S. Cl.
CPC ............ B60Q 3/283 (2017.02); F21V 19/003 (2013.01); *F21W 2106/00* (2018.01); *F21Y 2105/18* (2016.08); *F21Y 2113/00* (2013.01); *F21Y 2115/10* (2016.08)

(58) Field of Classification Search
CPC ... B60Q 3/283; F21V 19/003; F21W 2106/00
See application file for complete search history.

(56) References Cited

U.S. PATENT DOCUMENTS

| | | | |
|---|---|---|---|
| 2018/0222516 A1 | 8/2018 | Peyrot et al. | |
| 2020/0001782 A1* | 1/2020 | Kamei | ................ B60K 35/10 |
| 2021/0221285 A1 | 7/2021 | Kihara et al. | |
| 2024/0199108 A1* | 6/2024 | Miyata | .................... B60Q 3/14 |

FOREIGN PATENT DOCUMENTS

| | | | |
|---|---|---|---|
| JP | 2021-113040 A | | 8/2021 |
| JP | 2023130966 A | * | 9/2023 |
| WO | 2017/009163 A1 | | 1/2017 |

* cited by examiner

*Primary Examiner* — Karabi Guharay
(74) *Attorney, Agent, or Firm* — Posz Law Group, PLC (57) ABSTRACT

A steering wheel includes an illumination unit, an illumination arrangement part where the illumination unit is arranged, and an outer coat layer made of a leather member. The illumination arrangement part includes a covering portion covered with the outer coat layer and a recess part is formed at the covering portion. The recess part houses a terminal portion of the leather member and at least a part of the illumination unit, and has an opening opened outwardly. The illumination unit includes a light-emitting part, and a closing member having permeability to light emitted from the light-emitting part and closing the opening of the recess part. The covering portion includes a recess part side wall forming section forming a side surface of the recess part, and a recess part bottom wall forming section forming a bottom surface of the recess part. The terminal portion of the leather member is arranged continuously along the recess part side wall forming section and the recess part bottom wall forming section.

7 Claims, 9 Drawing Sheets

STEERING WHEEL HAVING ILLUMINATION UNIT

CROSS REFERENCE TO RELATED APPLICATIONS

The present application claims priority from Japanese patent application P2023-144074 filed on Sep. 6, 2023, the entire disclosure of which is hereby incorporated herein by reference.

BACKGROUND

Field

The present disclosure relates to a steering wheel.

Related Art

There is a known steering wheel including a member that emits light such as visible light or infrared light (hereinafter called an "illumination unit") mounted at a position visually recognizable from a driver. A steering wheel disclosed in Japanese Patent Application Publication No. 2021-113040 has a configuration where an outer coat layer made of natural leather or the like is wrapped around an outer surface of a covering layer surrounding a cored bar, and a light bar corresponding to the illumination unit is fitted in a recess part of the covering layer.

Regarding the steering wheel of the Japanese Patent Application Publication No. 2021-113040, however, a terminal portion of the outer coat layer is arranged simply by being bent at an opening end portion of the recess part and extended along a side wall of the recess part. Hence, in a configuration where the terminal portion is adhesively attached with an adhesive agent to the side wall of the recess part, a margin of adhesion is small to cause a problem that the outer coat layer tends to come off easily. Furthermore, the bending at the opening end portion of the recess part is done at a steep angle. Hence, the bend tries to restore its original shape with the restoring force of the outer coat layer (natural leather, for example), causing a problem that the outer coat layer tends to come off easily from the side wall of the recess part. This induces a desire for a technique that allows reduction in the occurrence of coming off of the terminal portion of the outer coat layer at the steering wheel.

SUMMARY

The present disclosure has been made to solve at least part of the above-described problem, and is feasible in the following aspect.

According to one aspect of the present disclosure, a steering wheel is provided. The steering wheel comprises: an illumination unit that emits light; an illumination arrangement part where the illumination unit is arranged; and an outer coat layer made of a leather member. The illumination arrangement part includes a covering portion covered with the outer coat layer and a recess part is formed at the covering portion. The recess part houses a terminal portion of the leather member and at least a part of the illumination unit, and has an opening opened outwardly. The illumination unit includes: a light-emitting part; and a closing member having permeability to light emitted from the light-emitting part and closing the opening of the recess part. The covering portion includes a recess part side wall forming section forming a side surface of the recess part, and a recess part bottom wall forming section forming a bottom surface of the recess part. The terminal portion of the leather member is arranged continuously along the recess part side wall forming section and the recess part bottom wall forming section.

DETAILED DESCRIPTION

A. First Embodiment

A-1. Overall Configuration of Steering Wheel 100

Figure 1:
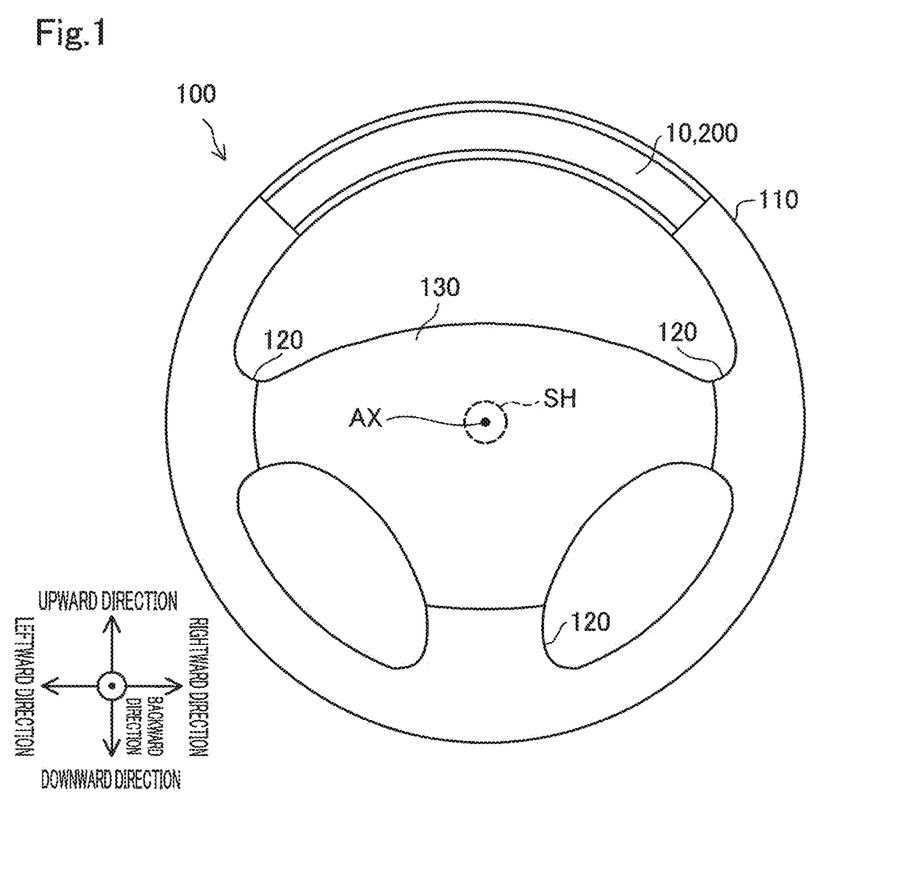
FIG. 1 is a plan view showing an appearance shape of a steering wheel according to one embodiment of the present disclosure.

FIG. 1 is a plan view showing an appearance shape of a steering wheel 100 according to one embedment of the present disclosure. The steering wheel 100 is arranged at a driver seat of a vehicle when it used. Examples of the vehicle include a vehicle with an engine, a hybrid vehicle (HEV), a plug-in hybrid vehicle (PHEV), a battery electric vehicle (BEV), and a fuel cell vehicle (FCV). The steering wheel 100 is one of steering devices to be operated by a driver of the vehicle. The steering wheel 100 shown in FIG. 1 is in a state where the steering wheel 100 is coupled to a steering shaft SH in the vehicle and the vehicle is to move straight ahead (this state will also be called a "standard state"). FIG. 1 shows an appearance configuration of the steering wheel 100 on a side facing the driver ("backward" side described later). The steering wheel 100 is configured to be capable of being rotated about an axis AX of the steering shaft SH. The rotation of the steering wheel 100 is transmitted via the steering shaft SH to a steering gear box.

In the present embodiment, a direction along the axis AX of the steering shaft SH is called a "forward-backward direction" (including a forward direction and a backward direction) in association with a traveling direction of the vehicle. Of directions perpendicular to the axis AX, a direction overlapping a vertical direction (including a vertically upward direction and a vertically downward direction) viewed from a driver is called an "upward-downward direction." Of the directions perpendicular to the axis AX, a direction parallel to a sidewise direction (width direction) of the vehicle is called a "rightward-leftward direction."

The steering wheel 100 includes a ring-shaped gripping part 110, a boss part 130 arranged at a substantially central area of the gripping part 110, three spoke parts 120, and an illumination unit 200 arranged at a part of the gripping part 110.

The gripping part 110 is gripped by a driver during operation of the steering wheel 100. In the present embodiment, the gripping part 110 has a substantially annular shape. The gripping part 110 has a center axis conforming to the axis AX of the steering shaft SH. Instead of the substantially annular shape, the shape of the gripping part 110 may be an arbitrary shape such as a polygonal shape or an oval shape, or may be an asymmetric shape such as a so-called D-shape. The shape of the gripping part 110 is not limited to an annular shape but may be an arbitrary shape composed of a plurality of parts provided at positions separate from each other. As will be described later, the gripping part 110 is configured by stacking a plurality of members in a thickness direction. An outermost layer is composed of an outer coat layer (outer coat layer 80 described later) made of a leather member. While not shown in FIG. 1, a recess part (recess part C1 described later) housing a part of the illumination unit 200 is formed at a partial area of the gripping part 110, which is a part of the gripping part 110 on an upward direction side in the reference state. A part of the illumination unit 200 is housed in the recess part C1. In other words, the illumination unit 200 is fitted in the recess part C1. An opening of the recess part C1 is blocked by the illumination unit 200.

The three spoke parts 120 couple the gripping part 110 and the boss part 130 to each other. The boss part 130 corresponds to a connection at which the steering wheel 100 is connected to the steering shaft SH. The boss part 130 houses therein a folded airbag and an inflator both not shown in the drawings. The boss part 130 may further house therein a temperature adjusting circuit forming a heater unit or various types of sensor units for detecting a room temperature or gripping of the gripping part 110 by a user. The three spoke parts 120 and the boss part 130 may be provided with various types of operation buttons for operating a navigation system, an audio system, etc. mounted on the vehicle, for example.

The illumination unit 200 emits light. In the present embodiment, light emitted by the illumination unit 200 includes visible light and infrared light (infrared ray). Emitting visible light from the illumination unit 200 allows a driver to be notified of various types of information. As an example, emitting rays of light of various colors or emitting flashing light allows the driver to be notified of certain information. More specifically, emitting red light allows the driver to be urged to grip the steering wheel 100. Furthermore, emitting infrared light from the illumination unit 200 allows an infrared camera to capture an image of a part of the body of the driver cleanly in a dark vehicle interior at night.

Figure 2:
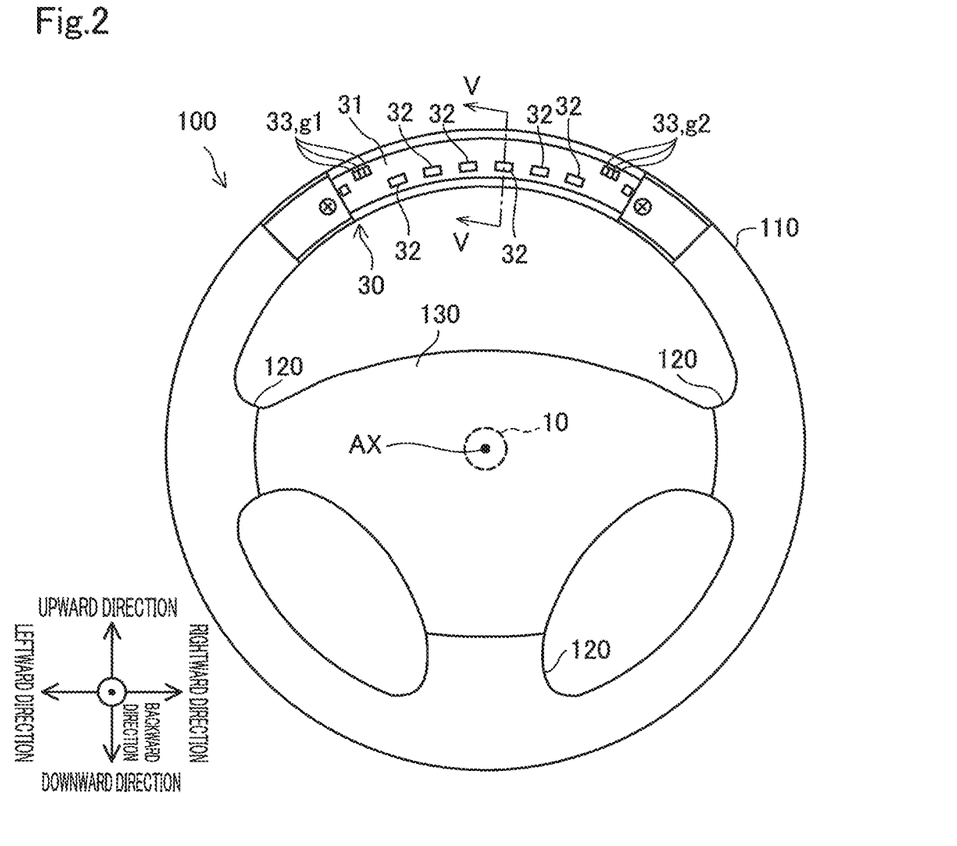
FIG. 2 is a plan view showing the appearance shape of the steering wheel from which a closing member and a light guide part are detached.

FIG. 2 is a plan view showing the appearance shape of the steering wheel 100 from which a closing member 10, a light guide part 20, and an illumination arrangement part 40 are detached. As will be described later, at the illumination unit 200, the closing member 10 having light permeability is arranged at a position facing a driver, and the light guide part 20 and the illumination arrangement part 40 described later are arranged on the forward direction side relative to the closing member 10. FIG. 2 schematically shows the steering wheel 100 in a state where the closing member 10, the light guide part 20, and the illumination arrangement part 40 are detached.

As shown in FIG. 2, detaching the closing member 10, the light guide part 20, and the illumination arrangement part 40 exposes a light-emitting part 30 as one of elements forming the illumination unit 200. The light-emitting part 30 includes a substrate 31, a plurality of first LEDs 32 mounted on the substrate 31, and a plurality of second LEDs 32 mounted on the substrate 31. As viewed from a driver, the substrate 31 has an arc-like and stripe-shaped appearance shape curved in a peripheral direction of the gripping part 110 (hereinafter also called a "peripheral direction" simply). In the following, a radial direction of the gripping part 110 (a direction perpendicular to the axis AX) will also be called a "radial direction" simply. The first LEDs 32 are arranged at positions on a surface of the substrate 31 on the backward direction side and close to an end portion of the surface on the downward direction side while separated from each other at certain distances therebetween in the peripheral direction. The first LEDs 32 emit visible light. In the present embodiment, visible light LEDs capable of emitting red light, green light, and blue light are used as the first LEDs 32. The second LEDs 33 form two groups g1 and g2 separated from each other. Each of the groups g1 and g2 is composed of a plurality of the second LEDs 33 adjacent to each other in the peripheral direction. The two groups g1 and g2 are both arranged at positions on the surface of the substrate 31 on the backward direction side and close to an end portion of the surface on the upward direction side. As viewed in the peripheral direction, the two groups g1 and g2 are separated from each other across the plurality of first LEDs 32.

A2. Detailed Configurations of Illumination Unit 200 and Illumination Arrangement Part 40

Figure 3:
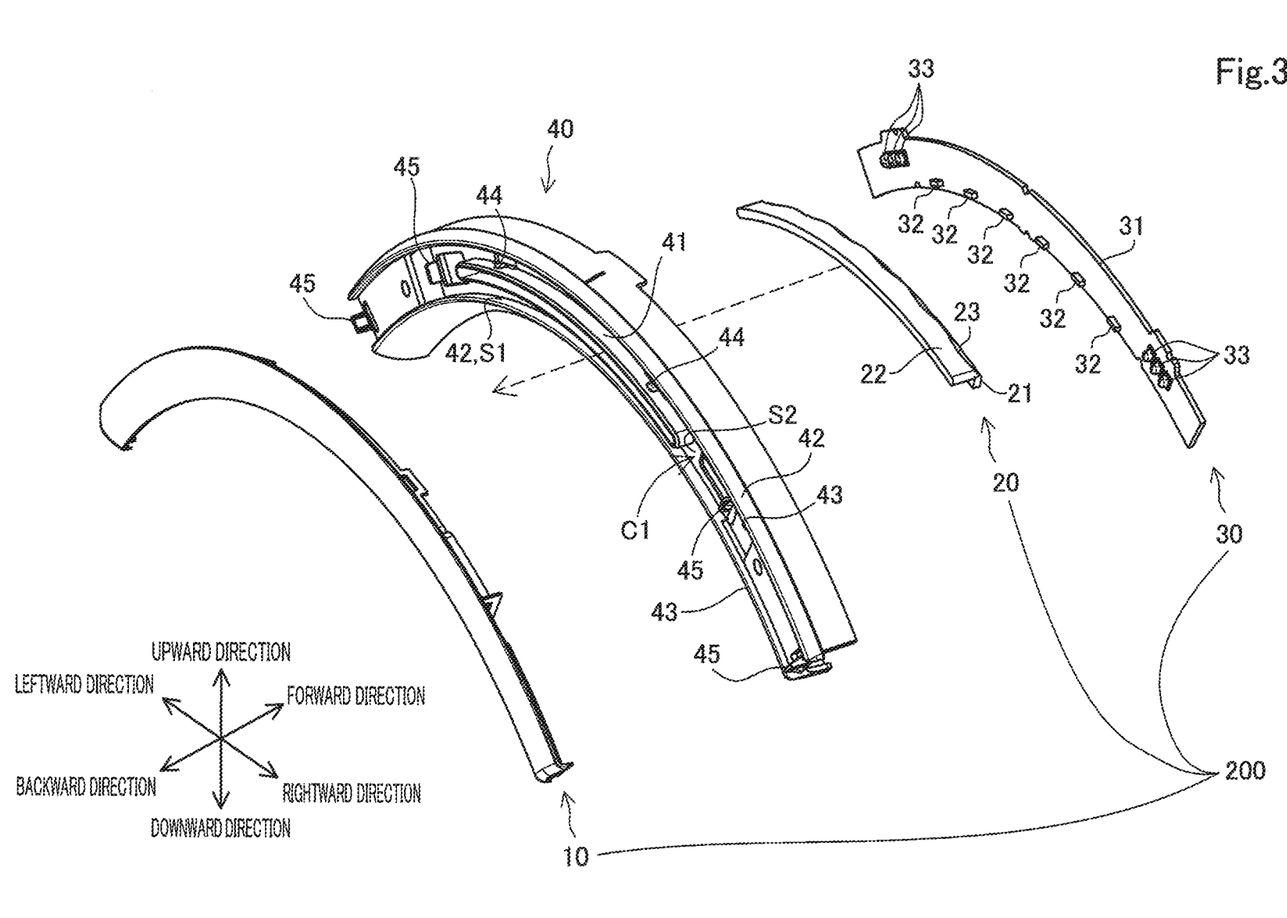
FIG. 3 is an exploded perspective view showing a detailed configuration of an illumination unit and an illumination arrangement part.
Figure 4:
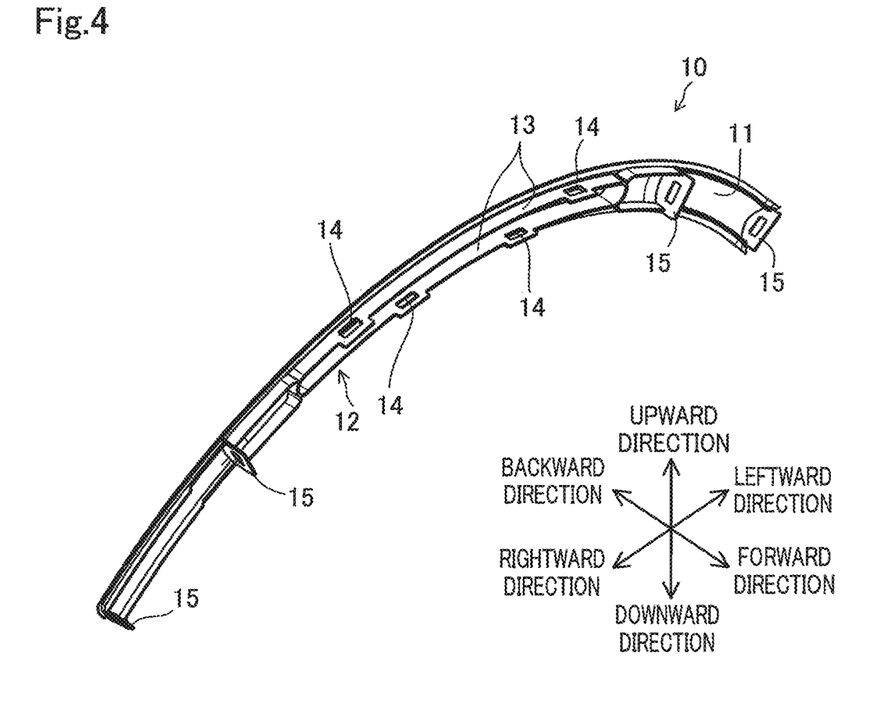
FIG. 4 is a perspective view showing a detailed configuration of the closing member on a forward direction side.
Figure 5:
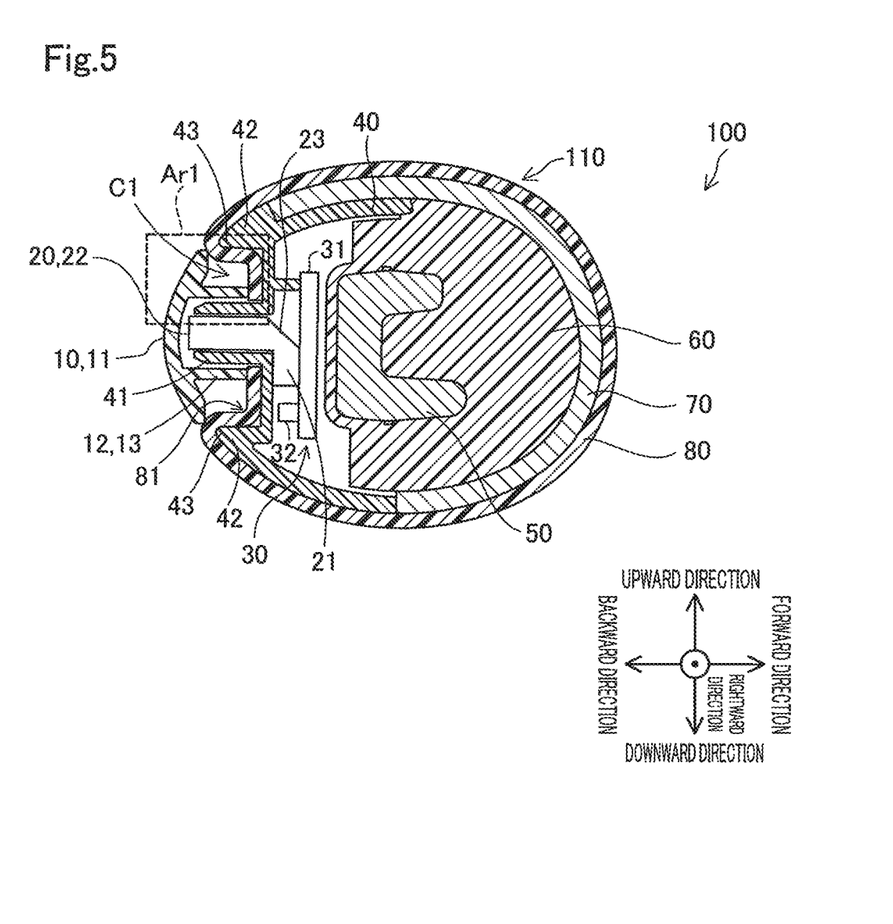
FIG. 5 is a sectional view showing a section of the steering wheel.

FIG. 3 is an exploded perspective view showing a detailed configuration of the illumination unit 200 and the illumination arrangement part 40. FIG. 4 is a perspective view showing a detailed configuration of the closing member 10 on the forward direction side. FIG. 5 is a sectional view showing a section of the steering wheel 100. FIG. 5 shows a section along V-V represented in FIG. 2. As shown in FIG. 3, the illumination unit 200 includes the closing member 10 and the light guide part 20 in addition to the light-emitting part 30 described above. The illumination unit 200 has a configuration where the light-emitting part 30 and the light guide part 20, and the closing member 10 are assembled with each other in the forward-backward direction to be integrated while the illumination arrangement part 40 is interposed therebetween.

As shown in FIG. 4, the closing member 10 includes an outer surface forming portion 11, a surrounding portion 12, and a plurality of engagement walls 15. The outer surface forming portion 11 shown in FIG. 5 extends continuously with the outer coat layer 80 to form an outer surface of the steering wheel 100. Like the substrate 31 described above, the outer surface forming portion 11 has an arc-like and stripe-shaped appearance shape curved in the peripheral direction of the gripping part 110 as viewed from a driver. The outer surface forming portion 11 has permeability to visible light and infrared light. In the present embodiment, the outer surface forming portion 11 has a permeability ratio of about 25% to visible light and has a permeability ratio of about 90% to infrared light. The ratio of permeability to each of visible light and infrared light may be any value greater than 0%. In the present embodiment, the outer surface forming portion 11 is made of black and transparent synthetic resin to match the outer coat layer 80 in black. In addition to a function of protecting the light-emitting part 30, the outer surface forming portion 11 has a function of limiting a region where visible light emitted from the first LED 32 is to pass through (in other words, a function of masking a region desired not to shine), and a function of deflecting infrared light emitted from the second LED 33 so as to cause the emitted infrared light to travel upward toward the backward direction side corresponding to a driver side. The outer surface forming portion 11 may further have a function of diffusing visible light emitted from the first LED 32.

As shown in FIG. 4, the surrounding portion 12 is provided on a surface of the outer surface forming portion 11 on the forward direction side (inner surface). In an assembled state of the illumination unit 200 (hereinafter also called an "assembled state" simply), the surrounding portion 12 is arranged in such a manner as to surround a light guide housing 41 of the illumination arrangement part 40 shown in FIGS. 3 and 5 projecting toward the backward direction side from the recess part C1 and to surround a part of the light guide part 20 housed in the light guide housing 41. The recess part C1 has a groove-like shape having an opening formed at a surface of the illumination arrangement part 40 in the forward direction and extending in the peripheral direction. The surrounding portion 12 has a projection 13 corresponding to a side wall extending in the radial direction and projecting in a depth direction of the recess part C1 from the surface of the outer surface forming portion 11 on the forward direction side, in other words, from the inner surface thereof. As clearly seen from FIGS. 3 and 5, the "depth direction of the recess part C1" of the present embodiment substantially conforms to the forward-backward direction. In the following, the "depth direction of the recess part C1" will also be called a "depth direction" simply. As shown in FIG. 4, the projection 13 is provided with a plurality of engagement holes 14. In the assembled state, engagement pawls 44 formed at an outer peripheral surface of the light guide housing 41 of the illumination arrangement part 40 (see FIG. 3) are engaged with the engagement holes 14. Such engagement is realized as so-called snap-fit. As shown in FIG. 4, each of the engagement walls 15 has a thin wall-like appearance shape projecting in the forward direction and is provided with an engagement hole. In the assembled state, the engagement wall 15 is arranged in contact with an engagement wall 45 of the illumination arrangement part 40 (see FIG. 3). In the assembled state, an engagement pawl formed at the engagement wall 45 is engaged with the engagement hole of the engagement wall 15. Such engagement is also realized as so-called snap-fit.

The light guide part 20 guides light emitted from the light-emitting part 30. More specifically, the light guide part 20 guides visible light emitted from the plurality of first LEDs 32 of the light-emitting part 30 so as to cause the visible light to travel in the backward direction toward the closing member 10. As shown in FIGS. 3 and 5, the light guide part 20 has an appearance shape with an L sectional shape taken along the axis AX. The light guide part 20 has an arc-like appearance shape viewed from a driver conforming to the locations of the plurality of first LEDs 32. The light guide part 20 has a shape with a first light guide 21 and a second light guide 22 connected to each other at a deflector 23. As clearly seen from the sectional view in FIG. 5, the visible light emitted from the first LED 32 travels toward the upward direction to enter the first light guide 21. The visible light having entered the first light guide 21 travels toward the upward direction while being reflected on an inner surface of the first light guide 21, is deflected toward the backward direction at the deflector 23, and is then guided to the second light guide 22. Next, the visible light travels toward the backward direction while being reflected on an inner surface of the second light guide 22, and then exits from an end surface of the second light guide 22 in the backward direction toward the closing member 10 (outer surface forming portion 11). As shown in FIG. 5, in the assembled state, the second light guide 22 is housed in the recess part C1. On the other hand, in the assembled state, the first light guide 21 and the deflector 23 are arranged on the forward direction side relative to the illumination arrangement part 40 and are not housed in the recess part C1.

The illumination unit 200 is arranged at the illumination arrangement part 40. More specifically, the illumination arrangement part 40 retains the light guide part 20 and the light-emitting part 30 on the forward direction side relative to the illumination arrangement part 40 itself and retains the closing member 10 on the backward direction side relative to the illumination arrangement part 40 itself. As shown in FIG. 3, as viewed from a driver, the illumination arrangement part 40 has an arc-like and stripe-shaped appearance shape curved in the peripheral direction. In the present embodiment, the illumination arrangement part 40 is configured as a single component made of ABS resin. The illumination arrangement part 40 may be configured as a single component made of polycarbonate (PC) instead of ABS resin or in addition to ABS resin. Alternatively, the illumination arrangement part 40 may be configured as a compound component with a plurality of combined parts. As described above, the recess part C1 extending continuously in the peripheral direction is formed at the surface of the illumination arrangement part 40 on the forward direction side. As shown in FIGS. 3 and 5, the illumination arrangement part 40 includes a covering portion 42 provided at the surface thereof on the forward direction side and extending continuously in the peripheral direction on each of the upward direction side and the downward direction side across the recess part C1. As shown in FIG. 5, an outer surface of the covering portion 42 has a sectional shape where a surface existing in the upward direction and a surface existing in the downward direction across an apex 43 form an acute angle. The covering portion 42 is covered with the outer coat layer 80 described later. The illumination arrangement part 40 is also called a retaining member or a base member.

The recess part C1 has a portion for the light guide part 20 where a through hole penetrating the recess part C1 in a thickness direction is formed. As shown in FIG. 5, the second light guide 22 of the light guide part 20 is inserted in this through hole. As shown in FIGS. 3 and 5, the recess part C1 is provided with the above-described light guide housing 41 arranged in such a manner as to surround the through hole with the second light guide 22 inserted therein. Like the surrounding portion 12 of the closing member 10 shown in FIG. 4, the light guide housing 41 projects in the forward direction in such a manner as to surround the through hole and the second light guide 22 inserted in the through hole. As shown in FIG. 3, the light guide housing 41 has a flat circular-cylindrical appearance shape curved in an arc-like form. As described above, the outer peripheral surface of the light guide housing 41 is provided with the plurality of engagement pawls 44. These engagement pawls 44 are engaged with the engagement holes 14 of the closing member 10 in the assembled state. A detailed configuration at the recess part C1 will be described later.

A3. Detailed Configuration of Gripping Part 110

At the gripping part 110, except for a region mounted with the illumination unit 200, the other region has a sectional configuration differing from a sectional configuration of the region mounted with the illumination unit 200 shown in FIG. 5 in that the other region is not mounted with the illumination unit 200, and is the same as the region mounted with the illumination unit 200 in the other configuration.

As shown in FIG. 5, the gripping part 110 includes a cored bar 50, a core part 60, an element layer 70, and the illumination arrangement part 40 and the outer coat layer 80 described above.

The cored bar 50 is a member made of metal and functioning as a framework of the gripping part 110. In the present embodiment, the cored bar 50 is made of an aluminum alloy. Instead of an aluminum alloy, any type of metal such as a magnesium alloy or steel may be used for forming the cored bar 50. The core part 60 is arranged in such a manner as to cover the cored bar 50 entirely and forms a core of the gripping part 110. The core part 60 is made of a soft synthetic resin having cushioning properties. More specifically, in the present embodiment, the core part 60 is made of soft foam such as polyurethane foam. The element layer 70 covers the core part 60 partially. The element layer 70 is a layer provided with a heating wire forming a heater unit or an electrode for detecting gripping. The element layer 70 is made of conductive cloth prepared by performing surface treatment such as carbon coating or metallic plating on fiber cloth, for example. As shown in FIG. 5, in the region of the gripping part 110 mounted with the illumination unit 200, the element layer 70 further covers a part of the illumination arrangement part 40. An outer surface of the element layer 70 and an outer surface of the part of the illumination arrangement part 40 form a continuous curved surface. The outer coat layer 80 covers the outer surface of the element layer 70, the outer surface of the covering portion 42 of the illumination arrangement part 40, and an inner side of the recess part C1 of the illumination arrangement part 40 continuously. As shown in FIG. 5, a terminal portion 81 of the leather member forming the outer coat layer 80 is housed in the recess part C1. Detailed configurations of the covering portion 42 and the terminal portion 81 will be described later. The outer coat layer 80 is made of the leather member. In the present embodiment, the leather member is made of natural leather such as top-grain leather or split leather split from top-grain leather. Instead of the natural leather, any type of leather material such as composite leather or artificial leather may be used for forming the leather member.

A4. Method of Manufacturing Steering Wheel 100

Described next is a method of manufacturing the steering wheel 100 having the above-described configuration. First, the cored bar 50 is formed. The core part 60 and the element layer 70 are formed in such a manner as to surround the cored bar 50. In the following, a member obtained in this way will be called a "wheel base material." The wheel base material may be formed by two-color molding, for example. Separately from the formation of the wheel base material, the illumination unit 200 is mounted on the illumination arrangement part 40. Instead of the above-described snap-fit, a screw may be used to mount the illumination unit 200 on the illumination arrangement part 40. In the following, a member with the illumination arrangement part 40 and the illumination unit 200 in a state of being assembled with each other will be called an "illumination sub-assy." Next, the illumination sub-assy is fastened to the cored bar 50 using a screw. By doing so, the wheel base material and the illumination sub-assy are integrated with each other. The section in FIG. 5 shows a region without the screw for the fastening. By fastening the illumination sub-assy and the cored bar 50 to each other with the screw in this way, it becomes possible for heat generated by light emission at the light-emitting part 30 to be transmitted to the cored bar 50, making it possible to prevent excessive temperature increase at the illumination unit 200. Next, the leather member is wrapped around an outer surface of a member including the wheel base material and the illumination sub-assy integrated with each other, thereby forming the outer coat layer 80. The outer coat layer 80 may be formed by wrapping each of a plurality of parts of the leather member in the peripheral direction, for example. Then, an adhesive agent is applied to a wall surface of the recess part C1 and the terminal portion 81 of the outer coat layer 80 is bent in conformity with the shape of the covering portion 42 and housed in the recess part C1, thereby attaching the terminal portion 81 adhesively to the wall surface of the recess part C1. Next, the closing member 10 is fitted in the recess part C1. In addition to the procedure described above, procedures are further taken such housing an airbag or an inflator not shown in the drawings into the boss part 130. Description of these procedures will be omitted.

A5. Detailed Configuration of Terminal Portion 81 at Recess Part C1

Figure 6:
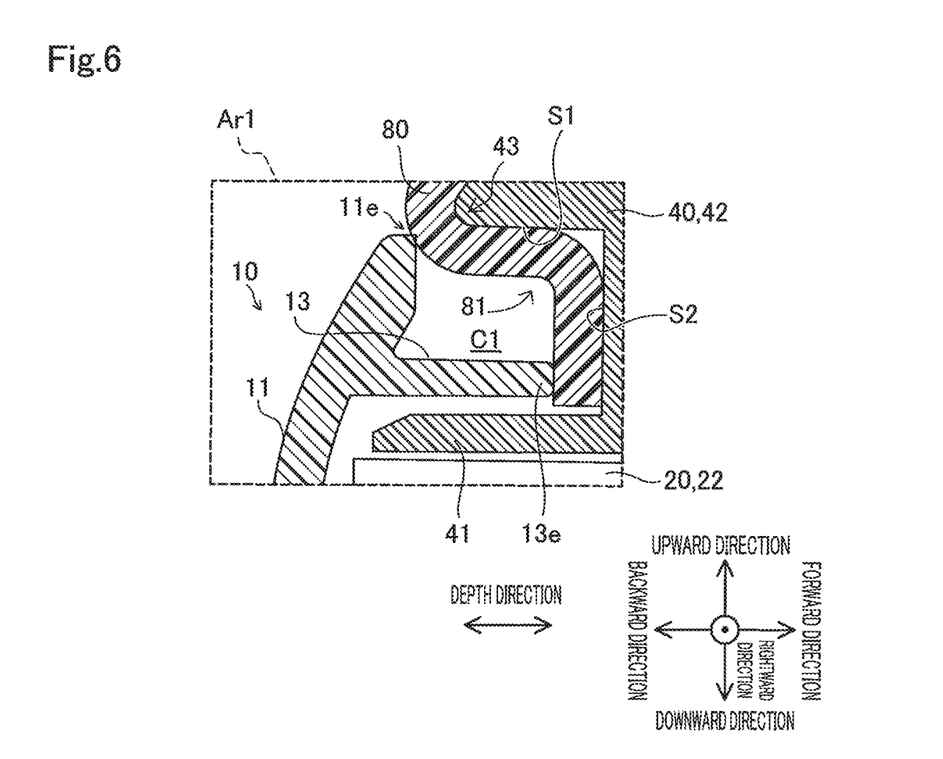
FIG. 6 is an enlarged sectional view showing a detailed configuration of a recess part and a periphery thereof according to a first embodiment.

FIG. 6 is an enlarged sectional view showing a detailed configuration of the recess part C1 and a periphery thereof according to the first embodiment. More specifically, FIG. 6 shows a region Ar1 represented by dashed lines in FIG. 5. As described above, the recess part C1 is formed at the covering portion 42 in the illumination arrangement part 40. The covering portion 42 has a recess part side wall forming section S1 forming a side wall of the recess part C1 extending in each of the upward direction and the downward direction, and a recess part bottom wall forming section S2 forming a bottom surface of the recess part C1. In the present embodiment, the recess part side wall forming section S1 is formed parallel to the forward-backward direction. Thus, the recess part C1 has a sectional area perpendicular to the depth direction that is uniform at any position in the depth direction. The recess part bottom wall forming section S2 is formed parallel to the upward-downward direction. Thus, in the present embodiment, the recess part side wall forming section S1 and the recess part bottom wall forming section S2 form an angle of 90 degrees.

The outer coat layer 80 is arranged in contact with the outer surface of the covering portion 42 and covers the covering portion 42. As shown in FIG. 6, the terminal portion 81 of the outer coat layer 80 (leather member) is bent at the apex 43 of the covering portion 42 and housed in the recess part C1. The terminal portion 81 is arranged continuously along the recess part side wall forming section S1 and the recess part bottom wall forming section S2. Thus, the terminal portion 81 is bent to approximately 90 degrees in the recess part C1. In the present embodiment, the terminal portion 81 is adhesively attached with an adhesive agent to the recess part side wall forming section S1. The terminal portion 81 is adhesively attached with an adhesive agent to the recess part bottom wall forming section S2. Providing the terminal portion 81 along the recess part bottom wall forming section S2 as well as along the recess part side wall forming section S1 allows the terminal portion 81 to extend longer along the wall surface. This makes it possible to reduce the occurrence of coming off of the terminal portion 81 from the wall surface forming the recess part C1. Additionally, as the terminal portion 81 is adhesively attached with the adhesive agent to the recess part bottom wall forming section S2 as well as to the recess part side wall forming section S1, it is possible to further reduce the occurrence of coming off of the terminal portion 81.

The outer surface forming portion 11 has an edge 11e defined in each of the upward direction and the downward direction and contacting the outer coat layer 80 (leather member) covering the apex 43. More specifically, the edge 11e of the outer surface forming portion 11 presses the leather member against the apex 43. Furthermore, the projection 13 has an end portion defined in the forward direction, namely, has a tip 13e contacting the terminal portion 81 arranged at the recess part bottom wall forming section S2. More specifically, the tip 13e of the projection 13 presses the leather member against the recess part bottom wall forming section S2. As the closing member 10 presses the terminal portion 81 of the leather member against the covering portion 42 in this way, it is possible to reduce the occurrence of coming off of the terminal portion 81.

According to the steering wheel 100 of the first embodiment described above, the terminal portion 81 of the outer coat layer 80 (leather member) is arranged continuously along the recess part side wall forming section S1 and the recess part bottom wall forming section S2. This allows the terminal portion 81 to extend longer along the wall surface of the recess part C1 than in a configuration where the terminal portion 81 is arranged only along the recess part side wall forming section S1. This makes it possible to reduce the occurrence of coming off of the terminal portion 81 from the wall surface of the recess part C1. Furthermore, it is possible to ensure a margin of application of an adhesive agent more largely than in a configuration where the terminal portion 81 is adhesively attached with the adhesive agent only to the recess part side wall forming section S1. This makes it possible to reduce the occurrence of coming off of the terminal portion 81 and to conduct the work of forming adhesion simply.

The tip of the projection 13 of the closing member 10 (surrounding portion 12) contacts the terminal portion 81 of the leather member arranged at the recess part bottom wall forming section S2. Thus, the terminal portion 81 is pressed with the projection 13, making it possible to further reduce the occurrence of coming off of the terminal portion 81.

The second light guide 22 of the light guide part 20 is arranged in the recess part C1 in such a manner as to extend in the depth direction. The projection 13 is arranged in such a manner as to surround the second light guide 22. Thus, it is possible to reduce the occurrence of displacement of the second light guide 22 using the projection 13 and to reduce the occurrence of emission of visible light from an unintended position at the second light guide 22.

The edge 11e of the outer surface forming portion 11 contacts the leather member (outer coat layer 80) covering an end portion of the opening of the recess part C1. Thus, the leather member is pressed with the outer surface forming portion 11, making it possible to further reduce the occurrence of coming off of the terminal portion 81 of the leather member.

The closing member 10 is fixed by the snap-fit between the engagement hole 14 provided at the projection 13 and the engagement pawl 44 provided at the illumination arrangement part 40, 40a (light guide housing 41). This allows the length of the recess part bottom wall forming section S2 in the upward-downward direction to be ensured more largely in response to increase in the width of the closing member 10 in the upward-downward direction. Thus, it is possible to make the terminal portion 81 extend longer along the recess part bottom wall forming section S2.

B. Second Embodiment

Figure 7:
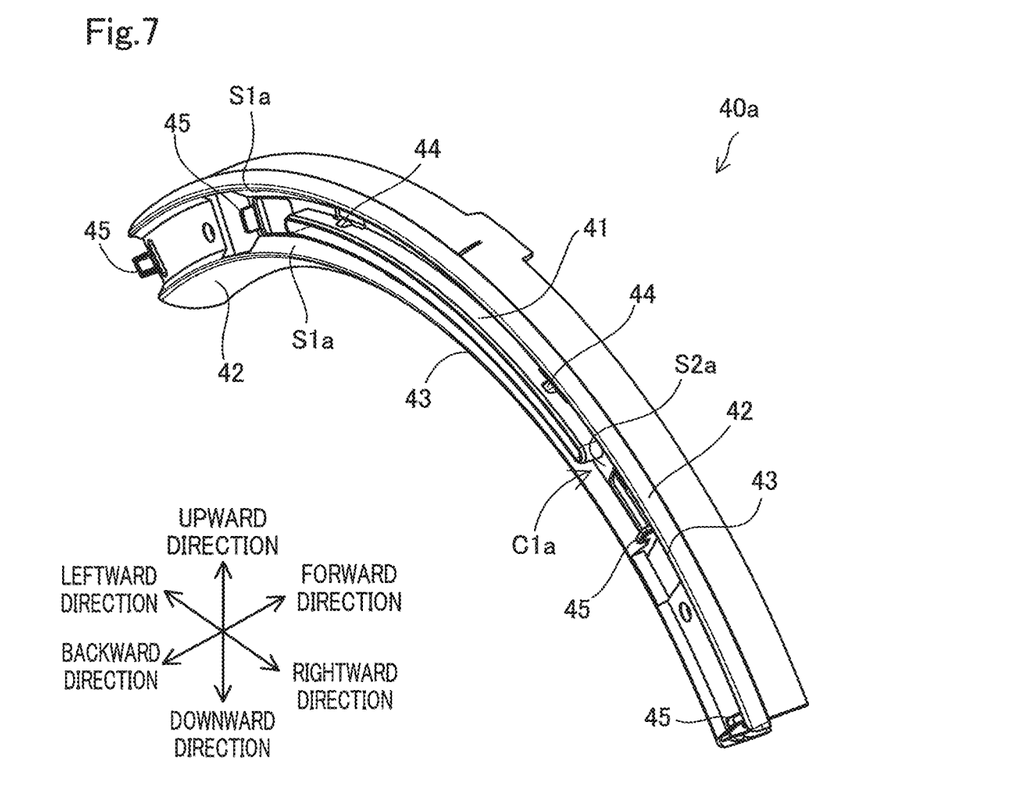
FIG. 7 is a perspective view showing a detailed configuration of an illumination arrangement part on a backward direction side according to a second embodiment.

FIG. 7 is a perspective view showing a detailed configuration of an illumination arrangement part 40a on the backward direction side according to a second embodiment. A steering wheel 100a of the second embodiment differs from the steering wheel 100 of the first embodiment in that the illumination arrangement part 40a is used instead of the illumination arrangement part 40, and the terminal portion 81 of the outer coat layer 80 is not adhesively attached with an adhesive agent to the covering portion 42. The other configuration of the steering wheel 100a of the second embodiment is the same as that of the steering wheel 100 of the first embodiment. Thus, the same constituting element will be given the same sign and a detailed description thereof will be omitted. The illumination arrangement part 40a differs from the illumination arrangement part 40 of the first embodiment in that a recess part C1a is formed instead of the recess part C1. The other constituting elements of the illumination arrangement part 40a are the same as those of the illumination arrangement part 40 of the first embodiment. Thus, the same constituting element will be given the same sign and a detailed description thereof will be omitted.

Figure 8:
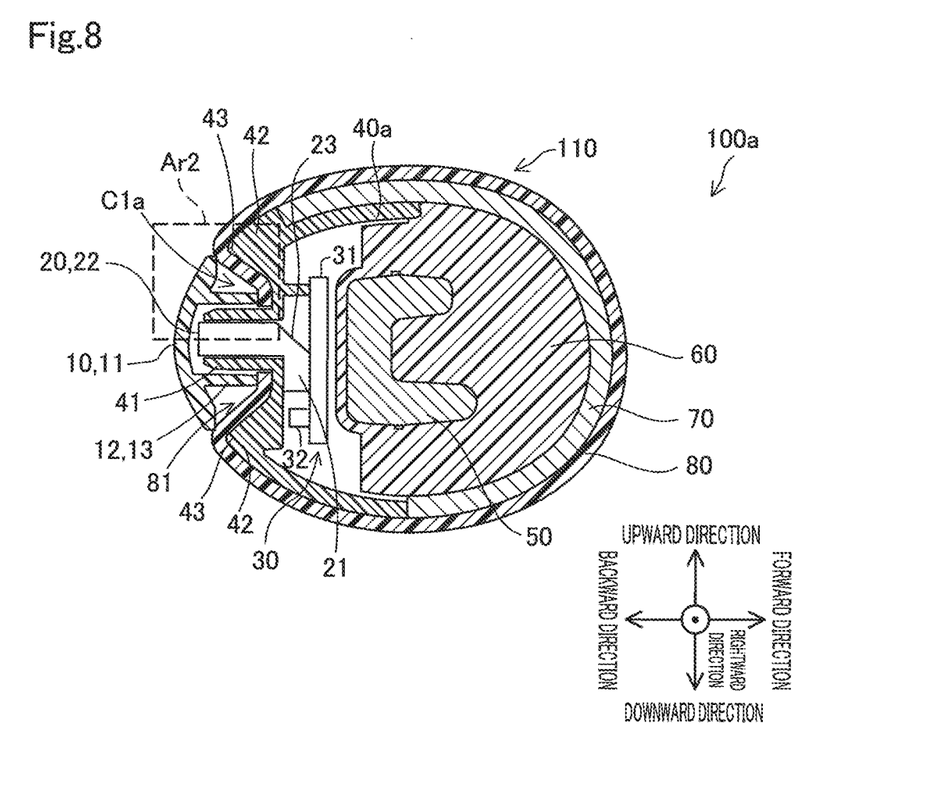
FIG. 8 is a sectional view showing a section of a steering wheel according to the second embodiment.
Figure 9:
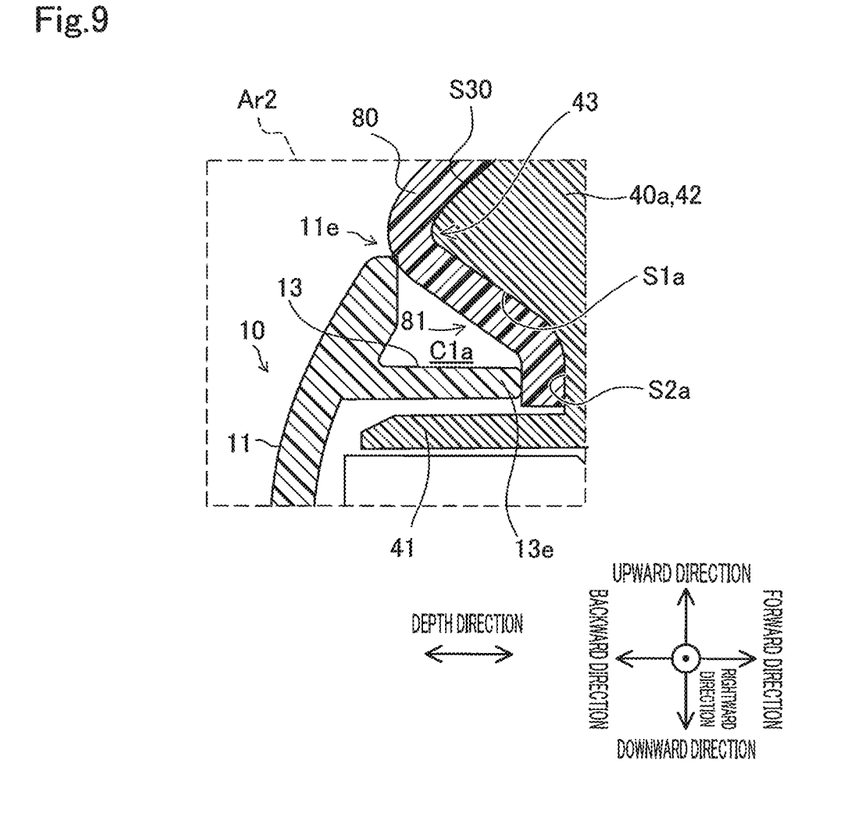
FIG. 9 is an enlarged sectional view showing a detailed configuration of a recess part and a periphery thereof according to the second embodiment.

FIG. 8 is a sectional view showing a section of the steering wheel 100a according to the second embodiment. Like FIG. 5, FIG. 8 shows a section taken at a position corresponding to that of the V-V section in FIG. 2. FIG. 9 is an enlarged sectional view showing a detailed configuration of the recess part C1a and a periphery thereof according to the second embodiment. More specifically, FIG. 9 shows a region Ar2 represented by dashed lines in FIG. 8.

As shown in FIGS. 8 and 9, at the illumination arrangement part 40a of the second embodiment, the covering portion 42 includes a recess part side wall forming section S1a instead of the recess part side wall forming section S1, and includes a recess part bottom wall forming section S2a instead of the recess part bottom wall forming section S2. Unlike the recess part side wall forming section S1 of the first embodiment, the recess part side wall forming section S1a of the second embodiment is not parallel to the forward-backward direction. More specifically, in the region Ar2, the recess part side wall forming section S1a is formed as a sloping surface that extends further in the downward direction gradually as the sloping surface extends further in the forward direction. As a result, the recess part bottom wall forming section S2a of the second embodiment has a length in a direction parallel to the upward-downward direction shorter than the length of the recess part bottom wall forming section S2 of the first embodiment.

As a result of the above-described configurations of the recess part side wall forming section S1a and the recess part bottom wall forming section S2a, the recess part C1a of the second embodiment is given a shape where a sectional area perpendicular to the depth direction (forward-backward direction) is reduced gradually with a greater distance from an opening of the recess part C1a in the depth direction. Furthermore, as a result of the above-described configurations of the recess part side wall forming section S1a and the recess part bottom wall forming section S2a, a sectional shape at a tip of the covering portion 42 in the backward direction, namely, a sectional shape at the apex 43 and a periphery thereof is not pointed sharply but is blunt compared to the sectional shape of the first embodiment, as clearly understood from a comparison between FIGS. 6 and 9. In other words, at the steering wheel 100a of the second embodiment, two sides extending from the apex 43 form an angle are larger than that at the steering wheel 100 of the first embodiment. With this configuration, it is possible to reduce restoring force generated at the terminal portion 81 bent at the apex 43 to extend along the recess part side wall forming section S1a. This makes it possible to further reduce the occurrence of coming off of the terminal portion 81. Additionally, capable of reducing the restoring force makes it possible to reduce the occurrence of coming off of the terminal portion 81 from the recess part side wall forming section S1a and the recess part bottom wall forming section S2a without the need of adhesively attaching the terminal portion 81 and the recess part side wall forming section S1a to each other with an adhesive agent and adhesively attaching the terminal portion 81 and the recess part bottom wall forming section S2a to each other with an adhesive agent.

The steering wheel 100a of the second embodiment described above achieves effect comparable to that achieved by the steering wheel 100 of the first embodiment. Additionally, the recess part C1a has a shape where a sectional area perpendicular to the depth direction is reduced gradually with a greater distance from the opening in the depth direction. Thus, compared to a configuration where a sectional area perpendicular to the depth direction of the recess part is uniform at any position in the depth direction or a configuration where a sectional area perpendicular to the depth direction is increased with a greater distance from the opening in the depth direction, it is possible to reduce the occurrence of excessive bending of the outer coat layer 80 at an end portion of the opening, thereby allowing further reduction in the occurrence of coming off of the terminal portion 81 of the outer coat layer 80 (leather member) to be caused by the restoring force of the leather member.

An adhesive member is absent between the terminal portion 81 of the outer coat layer 80 (leather member), and the recess part side wall forming section S1a and the recess part bottom wall forming section S2a. Thus, it is possible to simplify a step of manufacturing the steering wheel 100a. As described above, even without using an adhesive agent, it is still possible to reduce the occurrence of coming off of the terminal portion 81 by taking advantage of the shape of the recess part C1a.

C. Other Embodiments (C1) In each of the embodiments, the tip 13e of the projection 13 contacts the terminal portion 81 in an area where the terminal portion 81 extends along the recess part bottom wall forming section S2, S2a. However, the tip 13e may be separated from the terminal portion 81. Likewise, in each of the embodiments, the edge 11e of the outer surface forming portion 11 contacts the outer coat layer 80 (leather member) covering the apex 43. However, the edge 11e may be separated from the outer coat layer 80 (leather member). Even in this configuration, the terminal portion 81 is still arranged in such a manner as to extend along the recess part bottom wall forming section S2, S2a as well as along the recess part side wall forming section S1, S1a. Thus, it is possible to reduce the occurrence of coming off of the terminal portion 81.

(C2) In each of the embodiments, the covering portion 42 including the recess part C1, C1a belongs to the illumination arrangement part 40, 40a. However, the present disclosure is not limited to this. For example, in one possible configuration, the illumination arrangement part 40, 40a is omitted, and the shape of the core part 60 is changed to provide the core part 60 with the function of the illumination arrangement part 40, 40a. In this configuration, the core part 60 includes the covering portion 42 and the recess part C1, C1a is formed at the core part 60. In this configuration, the core part 60 corresponds to an illumination arrangement part of the present disclosure.

(C3) In each of the embodiments, the illumination arrangement part 40, 40a is provided at the gripping part 110. However, the present disclosure is not limited to this. In one configuration, the illumination arrangement part 40, 40a may be provided at an arbitrary part of the steering wheel 100 such as the boss part 130 or the spoke part 120, for example. In this case, the shape and configuration of the illumination unit 200 are suitably changeable in conformity with the size, shape, etc. of a place where the illumination arrangement part 40, 40a is provided. The position of the illumination arrangement part 40, 40a is desirably a position where the illumination arrangement part 40, 40a is visually recognizable directly from a driver. However, if light emitted from the illumination unit 200 is to be reflected on a surface of an arbitrary part inside the vehicle such as a surface of an instrument panel, for example, and if resultant reflected light is to be visually recognizable from a driver, for example, the position of the illumination arrangement part 40, 40a may be a position where the illumination arrangement part 40, 40a is visually unrecognizable directly from the driver.

(C4) The configuration of the steering wheel 100, 100a in each of the embodiments is given just as an example and is changeable in various ways. For example, the light guide part 20 is omissible in each of the embodiments. The projection 13 is omissible in each of the embodiments. In each of the embodiments, either the plurality of first LEDs 32 or the plurality of second LEDs 33 is omissible. Moreover, the substrate 31 is located toward the forward direction relative to the illumination arrangement part 40, 40a. Instead of this, the substrate 31 may be located toward the backward direction. Furthermore, while only the second light guide 22 of the light guide part 20 is housed in the recess part C1, C1a, the first light guide 21 and the deflector 23 may be housed at least partially in the recess part C1, C1a in addition to the second light guide 22.

The present disclosure is not limited to the embodiments described above and is able to be realized with various configurations without departing from the spirit thereof. For example, technical features in the embodiments corresponding to the technical features in the aspects described in the section of SUMMARY are able to be replaced with each other or combined together as necessary in order to solve part or the whole of the problems described previously or to achieve part or the whole of the effects described previously. When the technical features are not described as essential features in the present specification, they are able to be deleted as necessary. For example, the present disclosure may be realized in aspects described below.

(1) According to one aspect of the present disclosure, a steering wheel is provided. The steering wheel comprises: an illumination unit that emits light; an illumination arrangement part where the illumination unit is arranged; and an outer coat layer made of a leather member. The illumination arrangement part includes a covering portion covered with the outer coat layer and a recess part is formed at the covering portion. The recess part houses a terminal portion of the leather member and at least a part of the illumination unit, and has an opening opened outwardly. The illumination unit includes: a light-emitting part; and a closing member having permeability to light emitted from the light-emitting part and closing the opening of the recess part. The covering portion includes a recess part side wall forming section forming a side surface of the recess part, and a recess part bottom wall forming section forming a bottom surface of the recess part. The terminal portion of the leather member is arranged continuously along the recess part side wall forming section and the recess part bottom wall forming section.

According to the steering wheel of this aspect, the terminal portion of the leather member is arranged continuously along the recess part side wall forming section and the recess part bottom wall forming section. This allows the terminal portion to extend longer along a wall surface of the recess part than in a configuration where the terminal portion is arranged only along the recess part side wall forming section. This makes it possible to reduce the occurrence of coming off of the terminal portion from the wall surface of the recess part. Furthermore, in a configuration of using an adhesive agent, it is possible to ensure a margin of application of the adhesive agent more largely than in a configuration where the terminal portion is adhesively attached with the adhesive agent only to the recess part side wall forming section. This makes it possible to reduce the occurrence of coming off of the terminal portion and to conduct the work of forming adhesion simply.

(2) In the steering wheel of the above-described aspect, the recess part may have a shape where a sectional area perpendicular to a depth direction of the recess part is reduced gradually with a greater distance from the opening in the depth direction.

According to the steering wheel of this aspect, the recess part has a shape where a sectional area perpendicular to the depth direction of the recess part is reduced gradually with a greater distance from the opening in the depth direction. Thus, compared to a configuration where a sectional area perpendicular to the depth direction of the recess part is uniform at any position in the depth direction or a configuration where a sectional area perpendicular to the depth direction is increased with a greater distance from the opening in the depth direction, it is possible to reduce the occurrence of excessive bending of the outer coat layer at an end portion of the opening, thereby allowing further reduction in the occurrence of coming off of the terminal portion of the outer coat layer to be caused by the restoring force of the leather member.

(3) In the steering wheel of the above-described aspect, the closing member may include an outer surface forming portion extending continuously with the outer coat layer to form an outer surface of the steering wheel, and a projection projecting in a depth direction of the recess part from an inner surface of the outer surface forming portion facing the recess part. The projection may have a tip contacting the terminal portion of the leather member arranged at the recess part bottom wall forming section.

According to the steering wheel of this aspect, the tip of the projection of the closing member contacts the terminal portion of the leather member arranged at the recess part bottom wall forming section. Thus, the terminal portion is pressed with the projection, making it possible to reduce the occurrence of coming off of the terminal portion.

(4) In the steering wheel of the above-described aspect, an adhesive member may be absent between the terminal portion of the leather member, and the recess part side wall forming section and the recess part bottom wall forming section.

According to the steering wheel of this aspect, an adhesive member is absent between the terminal portion of the leather member, and the recess part side wall forming section and the recess part bottom wall forming section. Thus, it is possible to simplify a step of manufacturing the steering wheel. Even without using an adhesive agent, it is still possible to reduce the occurrence of coming off of the terminal portion by taking advantage of the shape of the recess part.

(5) In the steering wheel of the above-described aspect, the illumination unit may further include a light guide part that guides light emitted from the light-emitting part. The light guide part is housed at least partially in the recess part. At least a part of the light guide part close to the closing member may be arranged in the recess part in such a manner as to extend in the depth direction. The projection may be arranged in such a manner as to surround the light guide part.

According to the steering wheel of this aspect, at least the part of the light guide part close to the closing member is arranged in the recess part in such a manner as to extend in the depth direction, and the projection is arranged in such a manner as to surround the light guide part. Thus, it is possible to reduce the occurrence of displacement of the part forming the light guide part and existing in the recess part using the projection and to reduce the occurrence of emission of light from an unintended position at the light guide part.

(6) In the steering wheel of the above-described aspect, the outer surface forming portion may have an edge contacting the leather member covering an end portion of the opening.

According to the steering wheel of this aspect, the edge of the outer surface forming portion contacts the leather member covering the end portion of the opening. Thus, the leather member is pressed with the outer surface forming portion, making it possible to further reduce the occurrence of coming off of the terminal portion of the leather member.

The present disclosure is feasible in various aspects other than the steering wheel. For example, the present disclosure may be realized in aspects including a method of manufacturing a steering wheel.

What is claimed is:
1. A steering wheel comprising:
an illumination unit that emits light;
an illumination arrangement part where the illumination unit is arranged; and
an outer coat layer made of a leather member, wherein
the illumination arrangement part includes a covering portion covered with the outer coat layer and a recess part is formed at the covering portion, the recess part housing a terminal portion of the leather member and at least a part of the illumination unit, and having an opening opened outwardly,
the illumination unit includes:
a light-emitting part; and
a closing member having permeability to light emitted from the light-emitting part and closing the opening of the recess part,
the covering portion includes a recess part side wall forming section forming a side surface of the recess part, and a recess part bottom wall forming section forming a bottom surface of the recess part, and
the terminal portion of the leather member is arranged continuously along the recess part side wall forming section and the recess part bottom wall forming section.
2. The steering wheel according to claim 1, wherein
the recess part has a shape where a sectional area perpendicular to a depth direction of the recess part is reduced gradually with a greater distance from the opening in the depth direction.

3. The steering wheel according to claim 2, wherein
the closing member includes an outer surface forming portion extending continuously with the outer coat layer to form an outer surface of the steering wheel, and a projection projecting in a depth direction of the recess part from an inner surface of the outer surface forming portion facing the recess part, and
the projection has a tip contacting the terminal portion of the leather member arranged at the recess part bottom wall forming section.

4. The steering wheel according to claim 1, wherein
the closing member includes an outer surface forming portion extending continuously with the outer coat layer to form an outer surface of the steering wheel, and a projection projecting in a depth direction of the recess part from an inner surface of the outer surface forming portion facing the recess part, and
the projection has a tip contacting the terminal portion of the leather member arranged at the recess part bottom wall forming section.

5. The steering wheel according to claim 3, wherein
an adhesive member is absent between the terminal portion of the leather member, and the recess part side wall forming section and the recess part bottom wall forming section.

6. The steering wheel according to claim 3, wherein
the illumination unit further includes a light guide part that guides light emitted from the light-emitting part, the light guide part being housed at least partially in the recess part,
at least a part of the light guide part close to the closing member is arranged in the recess part in such a manner as to extend in the depth direction, and
the projection is arranged in such a manner as to surround the light guide part.

7. The steering wheel according to claim 3, wherein
the outer surface forming portion has an edge contacting the leather member covering an end portion of the opening.

* * * * *